United States Patent
Gerligand et al.

(10) Patent No.: US 9,454,020 B2
(45) Date of Patent: Sep. 27, 2016

(54) METHOD FOR DESIGNING CONTACT LENSES WITH SEMI-CUSTOMIZED BACK SURFACE

(71) Applicant: Johnson & Johnson Vision Care, Inc., Jacksonville, FL (US)

(72) Inventors: Pierre-Yves Gerligand, Jacksonville, FL (US); Brett A. Davis, Holland Park (AU); Michael J. Collins, Jollys Lookout (AU)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 9 days.

(21) Appl. No.: 14/522,740

(22) Filed: Oct. 24, 2014

(65) Prior Publication Data

US 2016/0116763 A1  Apr. 28, 2016

(51) Int. Cl.
| | |
|---|---|
| *G02C 3/00* | (2006.01) |
| *G02C 7/00* | (2006.01) |
| *G02C 7/02* | (2006.01) |
| *G02C 7/04* | (2006.01) |

(52) U.S. Cl.
CPC .............. *G02C 7/027* (2013.01); *G02C 7/028* (2013.01); *G02C 7/047* (2013.01); *G02C 2202/22* (2013.01)

(58) Field of Classification Search
CPC ...... A61B 3/1005; A61B 3/103; G02C 7/02; G02C 7/04
USPC ............. 359/159.01, 159.02, 159.73–159.77
See application file for complete search history.

(56) References Cited

U.S. PATENT DOCUMENTS

| | | | |
|---|---|---|---|
| 3,486,812 A * | 12/1969 | Volk | ............................... 351/205 |
| 3,950,082 A * | 4/1976 | Volk | ......................... 351/159.51 |
| 2004/0246440 A1 | 12/2004 | Andino | |
| 2006/0274262 A1 | 12/2006 | Andino et al. | |
| 2009/0303442 A1 | 12/2009 | Choo | |
| 2010/0271589 A1* | 10/2010 | Legerton et al. | ......... 351/160 R |

OTHER PUBLICATIONS

Aspherical and Continuous Curve Contact Lenses—Part Two, Bennett, A. G.., Optometry Today, Feb. 27, 1988, pp. 140-142.
Aspherical and Continuous Curve Contact Lenses—Part Three, Bennett, A. G., Optometry Today, Apr. 23, 1988, pp. 238-242.
Aspherical and Continuous Curve Contact Lenses—Part Four, Bennett, A. G., Optometry Today, Jul. 30, 1988, pp. 433-444.
William A. Douthwaite, "Application of linear regression to videokeratoscope data for tilted surfaces" Ophthal. Physiol. Opt., 2002, 22, 46-54.
W. R. Davies et al., "Corneal Asphericity and Apical Curvature in Children: A Cross-sectional and Longitudinal Evaluation", Investigative Ophthalmology & Visual Science, Jun. 2005, vol. 46, 1899-1906. doi:10.1167/iovs.04-0558.

* cited by examiner

*Primary Examiner* — James Greece

(57) ABSTRACT

The present invention is directed to a method for designing a soft contact lens with semi-customized back surface including determining axial radius topography data for a plurality of eyes of a specific population; calculating an apical radius and a conic constant distribution from the axial radius data; determining apical radius and conic constant values for an individual subject; selecting a subset of base curves from a base curve library based on the individual subject's apical radius and conic constant values; and selecting a final base curve from the subset of base curves that fits the individual subject's needs based on one or more selection criteria.

22 Claims, 8 Drawing Sheets

METHOD FOR DESIGNING CONTACT LENSES WITH SEMI-CUSTOMIZED BACK SURFACE

BACKGROUND OF INVENTION

1. Field of Invention

The present invention is directed to methods for designing contact lenses with a semi-customized back surface or base curve using a library of base curves. A base curve that best matches an individual subject's needs in terms of at least one of vision, comfort, fit, or handling, while minimizing wrapping of the contact lens on eye, is selected from the base curve library.

2. Description of Related Art

Wrapping, or flexure, occurs when a lens is placed on eye and the shape of the back surface of the lens reshapes to match the corneal geometry of the eye. For soft lenses, the back surface will substantially replicate the corneal geometry. For hard lenses, the back surface remains substantially the same. It is desirable to minimize lens wrapping so that vision correction will not be substantially affected.

Low order aberration corrections (e.g., defocus and astigmatism) are not as sensitive to lens wrapping as more complex vision corrections involving high order aberration corrections.

Minimizing the wrapping of contact lenses when correcting high order aberrations may be achieved by using corneal topography data to design a back surface or base curve of the lens. The elimination or minimization of the wrapping effect is obtained by matching the shape of the back surface of the lens within an optic zone to the corneal topography. This design approach ensures minimal change in the lens shape within the back optic zone when the contact lens is placed onto an eye.

However, manufacturing such contact lenses with a custom back surface is very expensive and time-consuming. Thus, there remains a need for semi-customization of the back surface of a contact lens to achieve a balance between design complexity, patient needs, and minimization of wrapping.

SUMMARY OF THE INVENTION

According to one aspect of the present invention, a method for designing a soft contact lens with a semi-customized back surface is directed to determining axial radius data for a plurality of eyes of a specific population; fitting the axial radius data using equations that define an aspheric surface as a change in axial radius for an apical radius and a conic constant; determining apical radius and conic constant values for an individual subject; selecting a subset of base curves from a base curve library based on the individual subject's apical radius and conic constant values; and selecting a final base curve from the subset of base curves that fits the individual subject's needs based on one or more selection criteria.

According to one aspect of the present invention, the base curve library may comprise a number of base curves that provide a grid of regularly-spaced apical radius and conic constant values.

According to another aspect of the present invention, a method for designing a soft contact lens with a semi-customized back surface is directed to measuring axial radius data for a plurality of eyes of a specific population; calculating an apical radius and a conic constant distribution from the axial radius data; determining apical radius and conic constant values for an individual subject; selecting a subset of base curves from a base curve library for the individual subject; and selecting a final base curve from the subset of base curves that fits the individual subject's needs based on one or more selection criteria.

The method of the present invention allows a back surface of a contact lens to be semi-customized, thereby matching an individual subject's needs in terms of at least one of vision, comfort, fit, or handling, while minimizing lens wrapping.

The present invention provides a simple, cost-effective and efficacious means and methods for semi-customization of the back surface of a contact lens.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF PREFERRED EMBODIMENTS

Figure 1A:
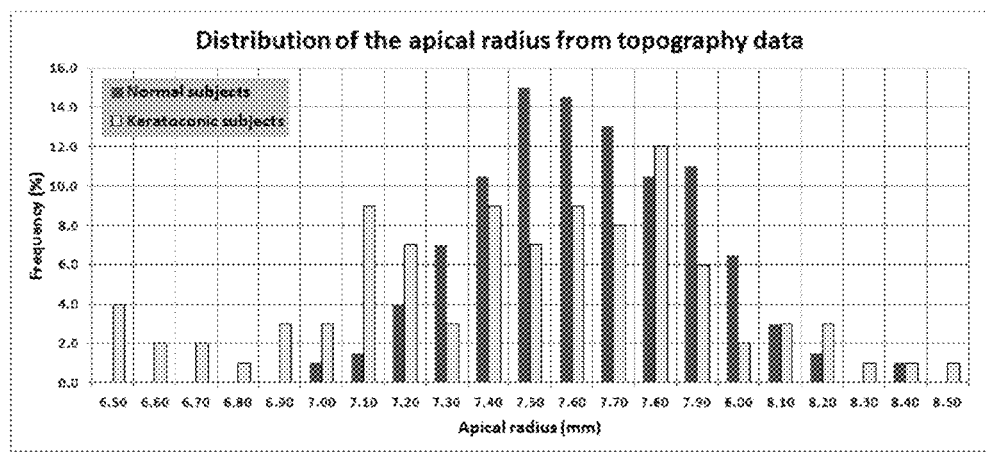
FIG. 1A illustrates an apical radius distribution obtained from corneal topography data for a population of normal and keratoconic subjects.

The present invention is directed to methods for designing contact lenses with a semi-customized back surface or base curve using a library of base curves and selecting a base curve that best matches a subject's needs in terms of at least one of vision, comfort, fit, or handling, without substantially impacting the visual and/or physical performance of the contact lens, and while minimizing wrapping of the contact lens on eye.

The methods of the present invention may be applied to any type of vision correction including, but not limited to, low order aberrations such as defocus resulting from myopia or hyperopia, astigmatism, presbyopia, and the like; and high order aberrations resulting from conditions such as keratoconus and the like; or any other vision correction that uses patient-specific vision information.

I. Lens Structure

In the present invention, a contact lens is defined by a front surface or surface power; a back surface or base curve; and an edge. In specific embodiments, the front and the back surface may comprise three regions: 1) an inner region or optical zone for providing vision correction; 2) an outer region for providing mechanical stability of the contact lens on eye; and 3) an intermediate region between the inner region and the outer region for blending the two aforementioned regions in a smooth manner, such that discontinuities do not occur or are substantially minimized.

The inner region or optical zone provides vision correction and may be designed for a specific vision need including, but not limited to, single vision correction, myopia, hyperopia, astigmatism, presbyopia or bi-focal vision correction, multi-focal vision correction, custom correction, or any other design that may provide vision correction or optical treatment such as myopia control.

The outer region provides stabilization of the lens on the eye, for example, centration and/or rotation. Rotation stabilization is fundamental when the inner region or optical zone has non-rotationally symmetric features, such as astigmatic vision correction and/or high order aberration correction.

The intermediate region ensures that the inner region and the outer region are blended, for example, with tangent curves. In specific embodiments, the optical zone and the outer region may be designed independently, though sometimes their designs are strongly related when particular requirements are necessary. For example, the design of a toric contact lens with an astigmatic optical zone may require a particular outer region for keeping the contact lens at a predetermined orientation on the eye.

Although a lens with three regions is described above, the methods of the present invention may also be used for a simple base curve having only one region that extends to a lens edge.

According to the present invention, the inner region or optical zone of the back surface of the lens may be semi-customized. However, the outer peripheral region may also be semi-customized according to a subject's particular needs.

II. Methods for Semi-Customization of Lens Back Surface

According to an exemplary embodiment of the present invention, a method for designing a contact lens with a semi-customized back surface comprises:

1. Determining axial radius data for a plurality of eyes of a specific population;
2. Fitting the axial radius data using equations that define an aspheric surface as a change in axial radius for an apical radius $R_0$ and a conic constant k;
3. Determining the apical radius $R_0$ and conic constant k values for an individual subject;
4. Selecting a subset of base curves from a base curve library based on the individual subject's ($R_0$, k) values; and
5. Selecting a final base curve that best fits the individual subject's needs based on one or more selection criteria.

A. Axial Radius Data Gathered and Fitted

According to the present invention, axial radius data is measured or calculated from corneal topography data for a plurality of eyes of a specific population. In specific embodiments, the corneal topography data, such as three dimensional data, may be obtained from a commercially-available corneal topographer, such as Optikon or Medmont.

The axial radius data is fitted with an equation for an aspheric surface as shown by Equation (1a) below. This equation defines how the axial radius (sagittal radius) changes with distance from the corneal apex, and can be fitted to the axial radius data using a least squares method to estimate the apical radius $R_0$ and conic constant k of Equation 1(b) below, $$R_S^2 = R_0^2 + (1-p) \cdot y^2 \quad (1a)$$

$$R_S^2 = R_0^2 + (-k) \cdot y^2 \quad (1b)$$

wherein $R_0$ is the apical radius (axial radius of the corneal apex), $R_S$ is the axial radius at a distance y from the corneal apex, and p is a rate of change of the axial radius with y. See Douthwaite, W., *Application of linear regression to videokeratoscope data for tilted surfaces*, Ophthal. Physiol. Opt. 22, 46-54 and Bennett, A., *Aspherical and continuous curve contact lenses*, Optometry Today 28, 140-142; 238-242; 433-444 (1988).

There may be a significant difference in distribution of $R_0$ and k values between different types of population, such as normal subjects and keratoconic subjects. Although this detailed description uses normal and keratoconic populations as examples, the present invention may be applied to populations with other specific vision needs as well.

According to a specific embodiment of the present invention, the distribution of apical radius $R_0$ and conic constant k were calculated from a set of 200 eyes for a population of normal subjects and from a set of 100 eyes for a population of keratoconic subjects. The data from an eye was considered to be part of the normal population data if the level of high order aberration (HOA) within a 5.00 mm pupil size did not exceed 0.25 μm. High order aberration can be estimated using commercially-available aberrometers, such as Complete Ophthalmic Analysis System (COAS) by WaveFront Sciences or iTrace by Tracey Technologies.

Results for the normal and keratoconic populations are shown below in Table 1.

TABLE 1

| $R_0$/k values for the normal and keratoconic populations | | | | |
|---|---|---|---|---|
| | Normal eyes | | Keratoconic eyes | |
| | Average | Std. dev. | Average | Std. dev. |
| Apical radius R (mm) | 7.59 | 0.26 | 7.48 | 0.56 |
| Conic constant (k) | −0.20 | 0.15 | −0.39 | 0.63 |

Figure 1B:
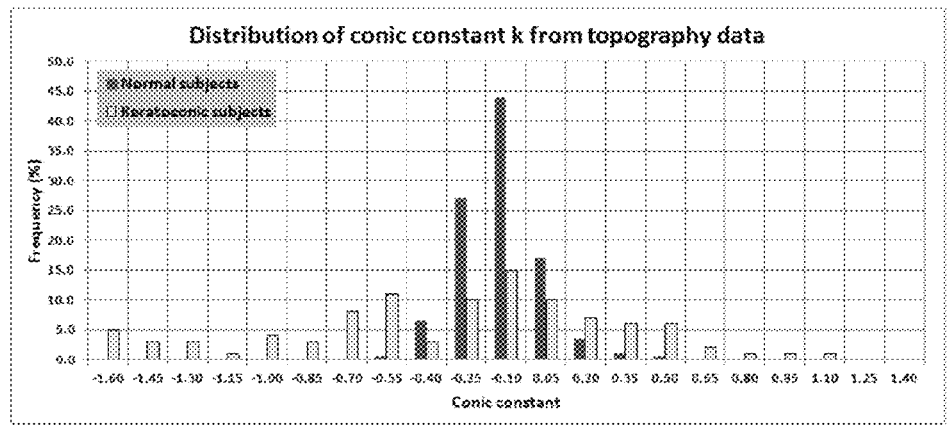
FIG. 1B illustrates a conic constant distribution obtained from corneal topography data for a population of normal and keratoconic subjects.

Distributions of the apical radius and conic constant values are illustrated in FIGS. 1A and 1B, respectively. The keratoconic population tends to have a steeper apical radius with a larger distribution of the conic constant. The standard deviation for the conic constant is about four times larger for the keratoconic eyes than for the normal eyes.

Figure 2:
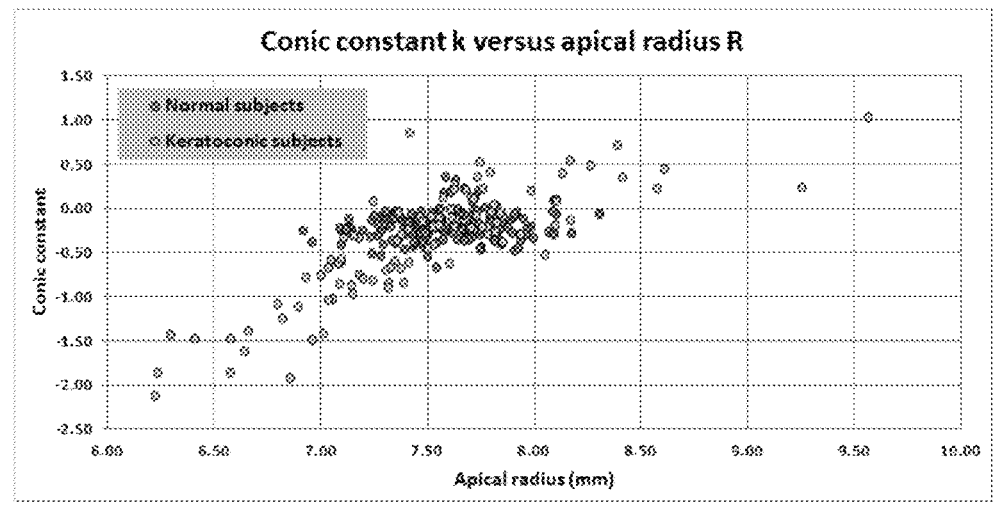
FIG. 2 illustrates a distribution of conic constant versus apical radius for the normal and keratoconic subjects of FIGS. 1A-1B.

FIG. 2 illustrates a distribution of the conic constant versus the apical radius for the normal and keratoconic populations of FIGS. 1A-1B. The distribution may be a normal Gaussian distribution. However, if the distribution is not representative of a normal distribution, the distribution may be represented by another mathematical function, such as a polynomial, that best represents the distribution. As described below, the distribution may be used to determine a percentage of the specific population covered by a select number of base curves in a base curve library.

B. Base Curve Library

According to the present invention, a base curve library may be built from a plurality of base curves. In specific embodiments, the number of base curves may be from about 10-500, for example, from about 20-100.

The base curves forming the base curve library may be selected based on evaluation of different base curves or contact lenses through clinical study. For example, a preferred range in the ($R_O$, k) space for each base curve may be selected based on clinical evaluation criteria including, but not limited to, vision, wearing comfort, fit, handling, minimization of lens wrapping, or any combination thereof.

Figure 3:
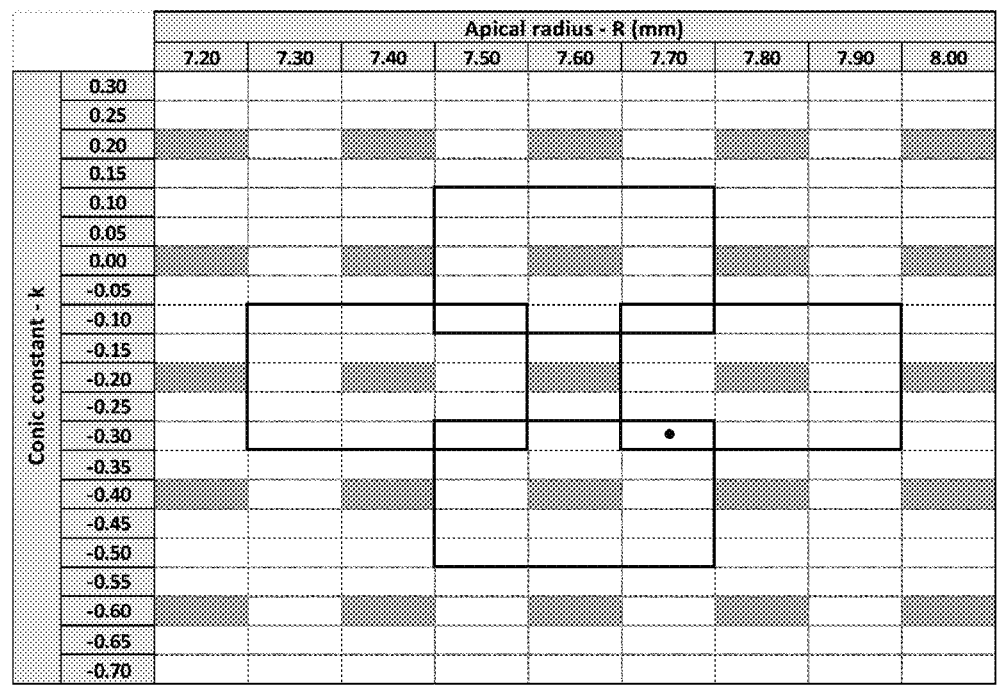
FIG. 3 illustrates a subset of base curves formed by overlapping base curves in a base curve library.

In specific embodiments, the base curves selected to build the base curve library may also be chosen to provide a grid of regularly-spaced ($R_O$, k) values, as illustrated in FIG. 3.

Figure 4:
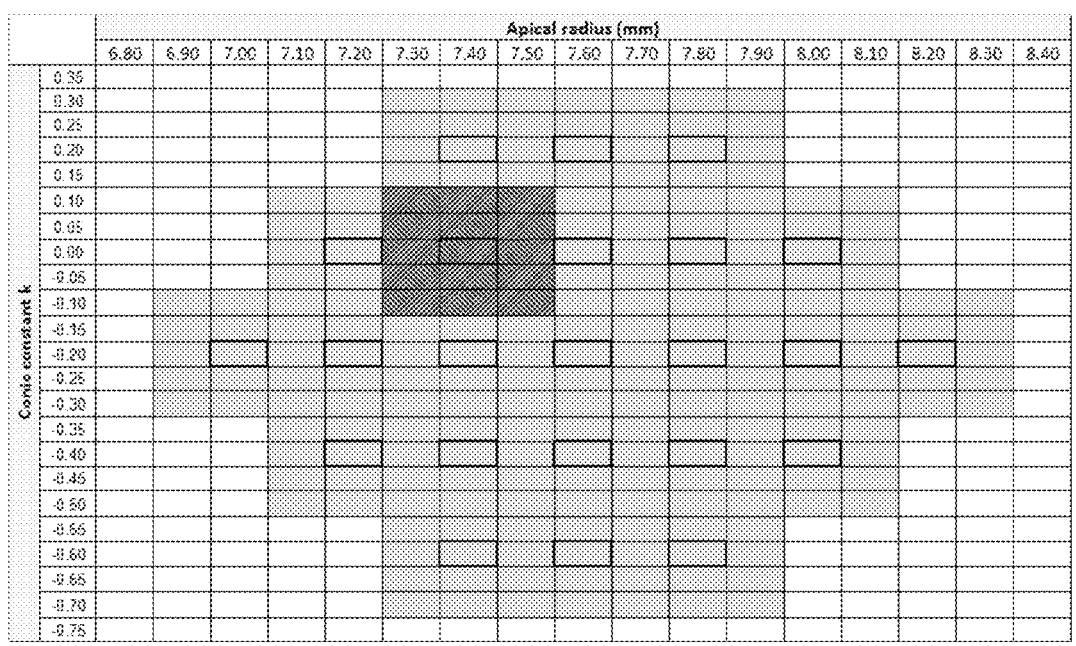
FIG. 4 illustrates a base curve library for a normal population, with a number of base curves selected to cover a high percentage of the population.

In another exemplary embodiment of the present invention, the base curve library may include a number of base curves that cover a high percentage of the specific population, for example, greater than 80%, 90%, or 95%, of the specific population. For example, as shown in FIG. 4, an apical radius increment $\Delta R_O$ of 0.20 mm and a conic constant increment $\Delta k$ of 0.20 may be chosen (highlighted for a base curve with $R_O$=7.40 mm, k=0.0). Using a normal Gaussian distribution with the average values and standard deviations given in Table 1 for the normal population, 23 individual base curves (dark rectangles) in FIG. 4 cover 97.90% of that population.

As shown in FIGS. 1-2, the range of the ($R_O$, k) values of the keratoconic population may be an extension of the normal population. Accordingly, the base curve library for a specific population may be an extension of a normal population base curve library. As a subject's needs might differ from the needs of normal subjects, the spacing of $R_O$ and k, as well as the maximum distance from an optimal base curve, might be adjusted to optimize the size of the base curve library.

C. Subset of Base Curves Selected from the Base Curve Library

According to the present invention, an apical radius $R_O$ and a conic constant k are measured or calculated for an individual subject. A subset of base curves within the base curve library is then selected based on the individual subject's ($R_O$, k) values.

In specific embodiments, the individual subject may have a low order eye aberration or vision defect selected from the group consisting of myopia, hyperopia, astigmatism, and presbyopia. Alternatively, the individual subject may have a substantial high order eye aberration.

According to a specific embodiment of the present invention, the subset of base curves may be obtained from multiple, alternate selections. For example, multiple selections may be obtained by overlapping ($R_O$, k) ranges of each base curve, as shown in the example of FIG. 3. In this particular example, four different overlapping base curves are chosen for an individual subject whose ($R_O$, k) values are represented by a dark dot ($R_O$=7.70 mm, k=−0.30). The subset of base curves in the base curve library are represented by the solid gray cells within the four overlapping dark rectangles.

In another specific embodiment of the present invention, one or more default patterns may be applied to a base curve library to select a subset of base curves for the individual subject. A default pattern may be selected based on how the individual subject's ($R_O$, k) values match a base curve ($R_O$, k) grid that forms the base curve library. As illustrative examples, four default patterns are described as follows for a regularly-spaced ($R_O$, k) grid.

Figure 5A:
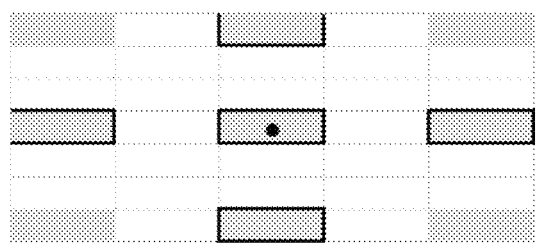
FIG. 5a illustrates a first default pattern applied to a base curve library to select a subset of base curves from the base curve library.

A first default pattern is illustrated in FIG. 5a, which shows that an individual subject's ($R_O$, k) values closely match one of the base curves in the base curve library (i.e., a dark dot representing the subject ($R_O$, k) values coincides with the ($R_O$, k) values of a solid gray base curve). The subset of base curves is selected from the best match and the four closest surrounding base curves.

Figure 5B:
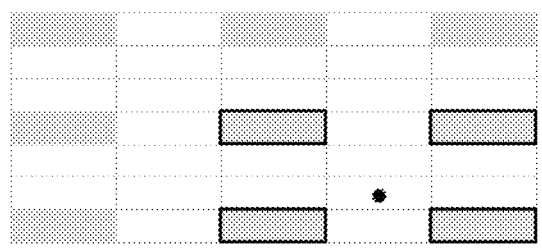
FIG. 5b illustrates a second default pattern applied to a base curve library to select a subset of base curves from the base curve library.

A second default pattern is illustrated in FIG. 5b, which shows that an individual subject's ($R_O$, k) values do not closely match any of the available base curves (i.e., a dark dot representing the subject ($R_O$, k) values does not coincide with any ($R_O$, k) values). The subset of base curves is selected from the four closest surrounding base curves.

Figure 5C:
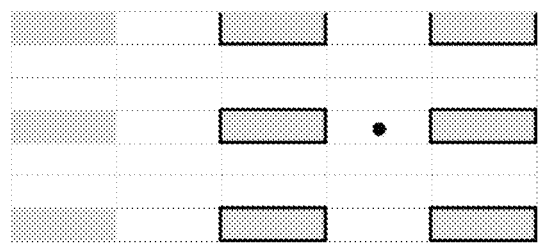
FIG. 5c illustrates a third default pattern applied to a base curve library to select a subset of base curves from the base curve library.

A third default pattern is illustrated in FIG. 5c, which shows that an individual subject's k value closely matches one set of base curves, but the $R_O$ value does not (i.e., a dark dot representing the subject (k) value coincides with a (k) value of at least one solid gray base curve). A subset of base curves is selected from the six closest surrounding base curves.

Figure 5D:
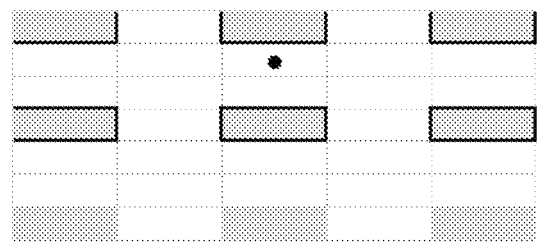
FIG. 5d illustrates a fourth default pattern applied to a base curve library to select a subset of base curves from the base curve library.

A fourth default pattern is illustrated in FIG. 5d, which shows that an individual subject's $R_O$ value closely matches one set of base curves, but the k value does not (i.e., a dark dot representing the subject ($R_O$) value coincides with an ($R_O$) value of at least one solid gray base curve). The subset of base curves is selected from the six closest surrounding base curves.

According to another specific embodiment of the present invention, a subset of base curves may be selected from base curves within a minimum distance from the individual subject's ($R_O$, k) values. The minimum distance D may be defined by the following formula, $$D=\sqrt{(R_O-R_{OB})^2+(k-k_B)^2} \qquad (2)$$

wherein $R_O$ and k are the apical radius and conic constant from a subject's axial radius or corneal topography data and $R_{OB}$ and $k_B$ the apical radius and conic constant of a base curve in the base curve library. The value of the minimum distance D defines the number of base curves to be selected. The value of the minimum distance D may be adjusted based on the type of subject on which the contact lens will be fitted (e.g., normal, astigmatic, keratoconic, or the like).

If the value of the minimum distance D is chosen such that the minimum distance D is $$D=\sqrt{\Delta R_O^2+\Delta k^2} \qquad (3)$$

wherein $\Delta R_O$ is the apical radius increment and $\Delta k$ the conic constant increment, then the subset of base curves may match one of the default patterns shown in FIGS. 5a-5d.

D. Final Base Curve Selected

Once a subset of base curves from the base curve library is selected, a final base curve that fits the individual subject's needs is selected from the subset of base curves based on one or more selection criteria.

The selection criteria for choosing the final base curve from the subset of base curves may emphasize one or more of vision, comfort, fit, or handling, while minimizing contact lens wrapping on eye.

For example, if a subject requires normal vision correction (i.e., has a low level of aberration), the selection criteria may be based on balancing corneal/scleral pressure applied by the contact lens. In this case, as the subject does not have a need for high order aberration correction, lens wrapping should not significantly affect vision correction. The selection method may therefore choose a base curve that emphasizes comfort and fit of the contact lens.

In contrast, if the subject is keratoconic (i.e., has substantial high order aberrations), the selection criteria may be based on minimizing the lens wrapping on eye, such as minimizing the surface Root Mean Square (RMS) over the inner region or optical zone diameter to reduce lens wrapping on eye (deformation of the optical zone) which could lead to a reduction in vision performance.

If a subject has mild keratoconus or has a history of adverse events (e.g., corneal or conjunctival staining, or the like), the selection criteria may be based on a combination of comfort/fit and lens wrapping, so that both effects may be adequately balanced.

E. Outer Region Selected

In specific embodiments, the outer region may be selected using two or more different base curve libraries. For example, one base curve library may be a steep base curve library (e.g., equivalent base curve radius below 8.40 mm) and another base curve library may be a flat base curve library (e.g., equivalent base curve radius above 8.80 mm), like standard commercially-available contact lenses manufactured with different choices of base curves.

The outer region may be selected according to at least one of the following criteria: 1) based on an equivalent base curve of the eye; 2) to balance corneal/scleral pressure; 3) to be an extension of the inner region or optical zone to give a single conic surface; or 4) any combination thereof.

In another exemplary embodiment of the invention, the outer region may be selected by clinical evaluation of contact lenses to best match an individual subject's needs in terms of at least one of comfort, fit, or handling, without impacting the visual performance of the contact lens.

F. Additional Embodiments

In another exemplary embodiment of the present invention, a range of equivalent base curves may be adjusted across the base curve library in order to match an equivalent back surface radius within the inner region or optical zone to a subset of apical radius $R_0$ and conic constant k values.

For example, a base curve radius may be defined by a circle of radius R fit through three points of a lens sagittal cross section. The three points are the sagittal apex at the lens center and the two end points of the chord over which the sagittal measurement is made. For a lens with a base curve having defined multiple spherical or aspheric zones, the equivalent base curve radius is the spherical radius that provides the same sagittal measurement between the sagittal apex and the two end points.

Figure 6:
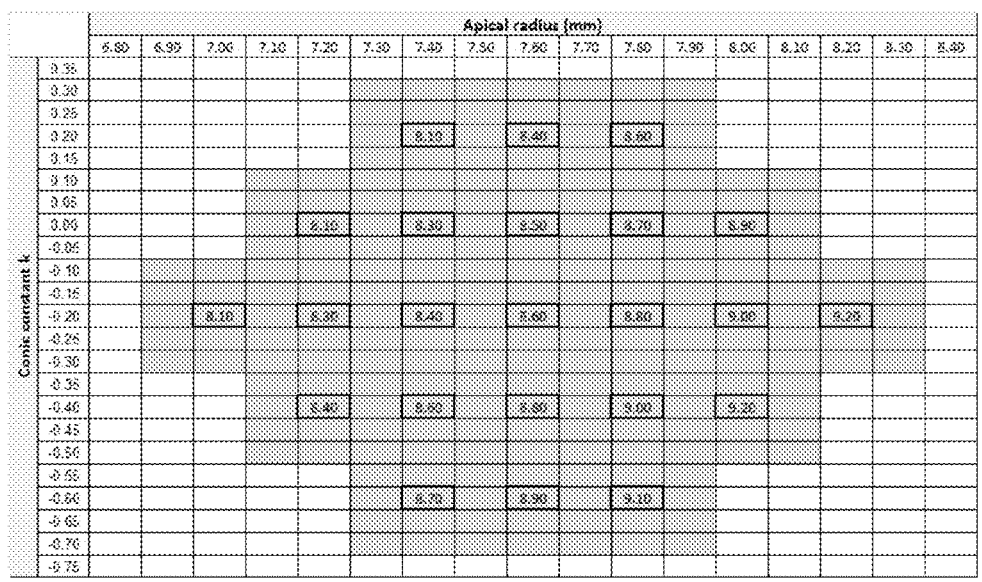
FIG. 6 illustrates an example of equivalent base curve radius adjusted across a base curve library.

Referring now to the example shown in FIG. 6, an equivalent base curve radius may vary from 8.10 mm to 9.20 mm for a range of apex radius $R_0$ of 1.40 mm (6.90 mm to 8.30 mm) and a range of conic constant k of 1.00 (−0.70 to 0.30). The dark rectangles illustrate how a range of equivalent base curves may be adjusted across the base curve library.

In another exemplary embodiment of the present invention, the back surface inner region or optical zone may be defined by an aspheric toric surface to optimize the fit to the corneal topography data. The back surface outer region or periphery can be adjusted according to the previous embodiments to best match each subject's needs in terms of at least one of vision, comfort, fit, or handling, without impacting the visual performance of the lens.

G. Lenses

Figure 7:
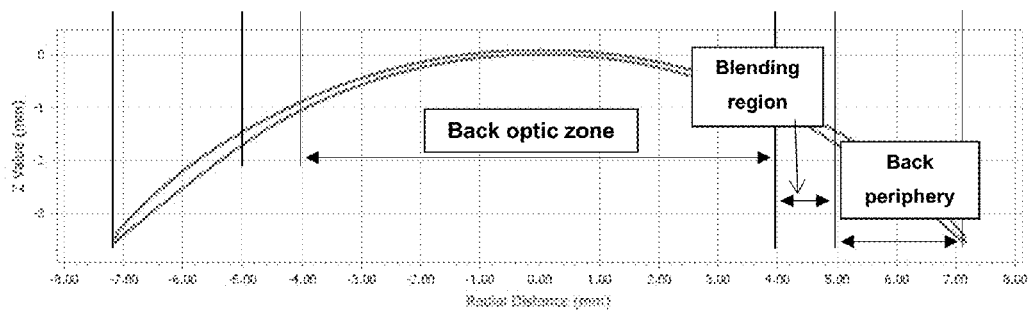
FIG. 7 is a diagrammatic representation of an exemplary contact lens in accordance with the present invention.

Referring now to FIG. 7, there is illustrated a schematic diagrammatic view of a contact lens in accordance with an embodiment of the present invention as discussed above. In specific embodiments, the diameter of the inner region or optic zone may be about 8 mm. The outer region or peripheral region may have boundary diameters from 5 mm to about 7 mm as measured from the geometric center of the lens. An intermediate or blending region, between the optic zone and the periphery, may have boundary diameters from 4 mm to about 5 mm as measured from the geometric center of the lens. It is important to note that FIG. 7 only illustrates an exemplary embodiment of the present invention.

It is important to note that the various zones in FIG. 7 are illustrated as concentric circles, the zones may comprise any suitable round or non-round shapes such as an elliptical shape.

Currently available contact lenses remain a cost effective means for vision correction. The thin plastic lenses fit over the cornea of the eye to correct vision defects, including myopia or nearsightedness, hyperopia or farsightedness, astigmatism, i.e. corneal toricity as well as other factors, and presbyopia, i.e., the loss of the ability of the crystalline lens to accommodate. Contact lenses are available in a variety of forms and are made of a variety of materials to provide different functionality.

Daily wear soft contact lenses are typically made from soft hydrogel or silicone hydrogel polymer materials. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

It is important to note that the methods of the present invention may be incorporated into any number of different contact lenses formed from any number of materials. Specifically, the contact lenses described herein, include, daily wear soft contact lenses, rigid gas permeable contact lenses, bifocal contact lenses, toric contact lenses, and hybrid contact lenses.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A method for designing a soft contact lens with a semi-customized back surface, comprising:
   determining axial radius data for a plurality of eyes of a specific population;
   fitting the axial radius data using equations that define an aspheric surface as a change in axial radius for an apical radius and a conic constant;
   determining apical radius and conic constant values for an individual subject;
   selecting a subset of base curves from a base curve library based on the individual subject's apical radius and conic constant values; and
   selecting a final base curve from said subset of base curves that fits the individual subject's needs based on one or more selection criteria.

2. The method according to claim 1, wherein said axial radius data for the specific population are measured or calculated from corneal topography data.

3. The method according to claim 1, wherein said fitting comprises calculating an apical radius $R_0$ and a conic constant k using the following Equations (1a) and (1b):

$$R_S^2 = R_0^2 + (1-p) \cdot y^2 \qquad (1a)$$

$$R_S^2 = R_0^2 + (-k) \cdot y^2 \qquad (1b)$$

wherein $R_0$ is the apical radius, $R_S$ is the axial radius at a distance y from the corneal apex, and p is a rate of change of the axial radius with y.

4. The method according to claim 1, wherein said specific population comprises subjects having a high order eye aberration.

5. The method according to claim 1, wherein said specific population comprises normal subjects having less than 0.25 μm of a high order aberration within a 5.00 mm pupil size.

6. The method according to claim 1, wherein said base curve library comprises a plurality of base curves.

7. The method according to claim 6, wherein each base curve comprises:
   an inner region for providing vision correction;
   an outer region for providing stability of the contact lens on eye; and
   an intermediate region between the inner region and the outer region.

8. The method according to claim 6, wherein a number of base curves is selected based on clinical evaluation criteria selected from the group consisting of vision, wearing comfort, fit, handling, minimization of lens wrapping, and any combination thereof.

9. The method according to claim 6, wherein a number of base curves is selected to cover a percentage of the specific population.

10. The method according to claim 9, wherein a number of base curves is selected to cover greater than 90% of the specific population.

11. The method according to claim 6, wherein said base curve library comprises a number of base curves that provides a grid of regularly-spaced apical radius and conic constant values.

12. The method according to claim 11, wherein said selecting a subset of base curves comprises selecting multiple base curves in said base curve library based on apical radius and conic constant ranges that overlap with the apical radius and conic constant for the individual subject.

13. The method according to claim 11, wherein said selecting a subset of base curves comprises applying a default pattern to said base curve library based on at least one of the individual subject's apical radius or conic constant.

14. The method according to claim 11, wherein said selecting a subset of base curves comprises selecting a base curve from said base curve library within a minimum distance of the individual subject's apical radius and conic constant according to the following equation (2):

$$D = \sqrt{(R_0 - R_{0B})^2 + (k - k_B)^2} \qquad (2)$$

wherein $R_{OB}$ and $k_B$ represent the apical radius and conic constant of the base curve, and D represents a minimum distance D that is adjusted based on an eye aberration of the individual subject.

15. The method according to claim 11, further comprising adjusting a range of equivalent base curves across the base curve library in order to match an equivalent back surface radius within the inner region or optical zone to a subset of apical radius and conic constant values.

16. The method according to claim 1, wherein the one or more selection criteria comprises at least one of vision, wearing comfort, fit, or handling.

17. The method according to claim 1, wherein the one or more selection criteria comprises minimization of lens wrapping.

18. The method according to claim 1, wherein the individual subject has a low order eye aberration or vision defect selected from the group consisting of myopia, hyperopia, astigmatism, and presbyopia.

19. The method according to claim 1, wherein the individual subject has a substantial high order eye aberration.

20. The method according to claim 1, further comprising selecting an outer region using two or more different base curve libraries.

21. The method according to claim 20, selecting the outer region based on an equivalent base curve of the eye; to balance corneal/scleral pressure; to be an extension of an inner region or optical zone to give a single conic surface; or any combination thereof.

22. A method for designing a soft contact lens with a semi-customized back surface, comprising:
   measuring axial radius data for a plurality of eyes of a specific population;
   calculating an apical radius and a conic constant distribution from the axial radius data;
   determining apical radius and a conic constant values for an individual subject;
   selecting a subset of base curves from a base curve library for the individual subject; and
   selecting a final base curve from the subset of base curves that fits the individual subject's needs based on one or more selection criteria.

* * * * *